United States Patent
Chencinski et al.

(10) Patent No.: US 8,880,957 B2
(45) Date of Patent: *Nov. 4, 2014

(54) FACILITATING PROCESSING IN A COMMUNICATIONS ENVIRONMENT USING STOP SIGNALING

(75) Inventors: Edward W. Chencinski, Poughkeepsie, NY (US); Michael Jung, Frankfurt am Main (DE); Martin Rehm, Boebligen (DE); Philip A. Sciuto, LaGrange, NY (US)

(73) Assignee: International Business Machines Corporation, Armonk, NY (US)

( * ) Notice: Subject to any disclaimer, the term of this patent is extended or adjusted under 35 U.S.C. 154(b) by 37 days.

This patent is subject to a terminal disclaimer.

(21) Appl. No.: 13/459,162

(22) Filed: Apr. 28, 2012

(65) Prior Publication Data

US 2012/0311206 A1      Dec. 6, 2012

Related U.S. Application Data

(63) Continuation of application No. 13/151,119, filed on Jun. 1, 2011.

(51) Int. Cl.
*G06F 11/00* (2006.01)

(52) U.S. Cl.
USPC .......................................................... 714/43

(58) Field of Classification Search
USPC .......................................................... 714/43
See application file for complete search history.

(56) References Cited

U.S. PATENT DOCUMENTS

| | | |
|---|---|---|
| 5,220,567 A | 6/1993 | Dooley et al. |
| 5,321,698 A | 6/1994 | Nguyen et al. |
| 5,519,693 A | 5/1996 | Galuszka et al. |
| 6,031,819 A | 2/2000 | Croslin |
| 6,078,736 A | 6/2000 | Guccione |
| 6,188,701 B1 | 2/2001 | Tsukamoto et al. |
| 6,292,910 B1 | 9/2001 | Cummins |

(Continued)

FOREIGN PATENT DOCUMENTS

| | | |
|---|---|---|
| CN | 1051420 C | 4/2000 |
| CN | 1904841 A | 1/2007 |

(Continued)

OTHER PUBLICATIONS

Chencinski, E.W. et al., "IBM System z10 I/O Subsystem," IBM J. Res. & Dev., vol. 53, No. 1, p. 6, Jan. 2009, pp. 6:1-6:13.

(Continued)

*Primary Examiner* — Scott Baderman
*Assistant Examiner* — Jigar Patel
(74) *Attorney, Agent, or Firm* — Steven Chiu, Esq.; Blanche E. Schiller, Esq.; Heslin Rothenberg Farley & Mesiti P.C.

(57) ABSTRACT

Processing, such as debug and/or recovery processing, within a communications environment is facilitated. Responsive to detecting an event, a stop signal is propagated through a communications network of the communications environment, and each network element that receives the stop signal, transmits the signal to its neighbors (if any), and then performs an action depending on its specific programming. The action can be to take no action, perform a debugging action or perform a recovery action. The elements that receive the signal and perform the same action as other elements form a coordinated network providing a coordinated result.

20 Claims, 6 Drawing Sheets

(56) References Cited

U.S. PATENT DOCUMENTS

| | | |
|---|---|---|
| 6,314,477 B1 | 11/2001 | Cowger et al. |
| 6,557,101 B1 | 4/2003 | MacDonald et al. |
| 6,760,302 B1 | 7/2004 | Ellinas et al. |
| 6,867,614 B1 | 3/2005 | Le Graverand et al. |
| 6,937,063 B1 | 8/2005 | Sun et al. |
| 7,096,398 B1 | 8/2006 | Mukherjee |
| 7,210,000 B2 | 4/2007 | Creta et al. |
| 7,231,560 B2 | 6/2007 | Lai et al. |
| 7,298,695 B1 | 11/2007 | Cortez et al. |
| 7,412,555 B2 | 8/2008 | Wang |
| 7,412,589 B2 | 8/2008 | Feiste |
| 7,437,643 B2 | 10/2008 | Khanna et al. |
| 7,443,869 B2 | 10/2008 | Solomon et al. |
| 7,463,056 B1 | 12/2008 | Anderson et al. |
| 7,482,835 B1 | 1/2009 | Sun et al. |
| 7,519,865 B1 | 4/2009 | Maly et al. |
| 7,602,726 B1 | 10/2009 | Sundaresan et al. |
| 7,616,508 B1 | 11/2009 | Landry et al. |
| 7,676,611 B2 | 3/2010 | Hui et al. |
| 7,685,380 B1 | 3/2010 | Khu |
| 7,747,809 B2 | 6/2010 | Hanscom |
| 7,774,638 B1 | 8/2010 | Cavanagh et al. |
| 7,782,760 B2 | 8/2010 | Froroth et al. |
| 7,809,370 B2 | 10/2010 | Stolte et al. |
| 7,836,352 B2 | 11/2010 | Sharma et al. |
| 7,853,774 B1 | 12/2010 | Wentzlaff |
| 7,882,296 B2 | 2/2011 | Reed |
| 2002/0129300 A1* | 9/2002 | Floyd et al. .................... 714/39 |
| 2003/0012129 A1 | 1/2003 | Lee et al. |
| 2003/0133461 A1 | 7/2003 | Ho et al. |
| 2003/0189895 A1 | 10/2003 | Limaye et al. |
| 2005/0060591 A1* | 3/2005 | Yoshiyama et al. .......... 713/320 |
| 2006/0126503 A1 | 6/2006 | Huck et al. |
| 2006/0159115 A1* | 7/2006 | Haneda et al. ................ 370/422 |
| 2007/0104109 A1 | 5/2007 | Jiang |
| 2007/0195692 A1 | 8/2007 | Hagglund et al. |
| 2007/0233821 A1 | 10/2007 | Sullivan et al. |
| 2008/0163005 A1 | 7/2008 | Sonksen et al. |
| 2008/0309349 A1* | 12/2008 | Sutono .......................... 324/537 |
| 2009/0201806 A1 | 8/2009 | Ding et al. |
| 2009/0292960 A1 | 11/2009 | Haraden et al. |
| 2009/0304007 A1 | 12/2009 | Tanaka et al. |
| 2010/0080119 A1 | 4/2010 | Ansorge |
| 2010/0083040 A1 | 4/2010 | Voigt et al. |
| 2010/0177632 A1 | 7/2010 | Tarnanen |
| 2010/0226244 A1 | 9/2010 | Mizutani et al. |
| 2010/0246408 A1 | 9/2010 | Kerber et al. |
| 2010/0251055 A1 | 9/2010 | Murakami et al. |
| 2010/0306442 A1 | 12/2010 | Gregg |
| 2010/0325495 A1 | 12/2010 | Talla et al. |
| 2011/0029706 A1 | 2/2011 | Bekooij et al. |
| 2011/0170405 A1 | 7/2011 | Beecroft et al. |
| 2012/0311133 A1 | 12/2012 | Chencinski et al. |
| 2012/0311373 A1 | 12/2012 | Chencinski et al. |
| 2013/0111258 A1 | 5/2013 | Chencinski et al. |

FOREIGN PATENT DOCUMENTS

| | | |
|---|---|---|
| CN | 101043383 A | 9/2007 |
| CN | 101048985 A | 10/2007 |
| CN | 101097532 A | 1/2008 |
| CN | 101379671 A | 3/2009 |
| EP | 0947049 A1 | 10/1999 |
| WO | WO201216417 A1 | 12/2012 |

OTHER PUBLICATIONS

Blank, Annika et al., "Advanced Power Virtualization on IBM System p5," IBM.com/redbooks, Oct. 2005, pp. 1-452.

Mitchell, Jim et al., "IBM Power5 Process-based Servers: A Highly Available Design for Business-Critical Applications," Oct. 2005, pp. 1-44.

Patel, Bindesh et al., "Transaction-based Debug of PCI Express Embedded SoC Platforms," CompactPCI and AdvancedTCA Systems, Dec. 2004, pp. 1-4.

Paz-Vincente, R. et al., "Time-Recovering PCI-AER Interface for Bio-Inspired Spiking Systems," Proceedings of the SPIE—The International Society for Optical Engineering, vol. 5839, No. 1, pp. 111-118, May 2005.

"z/Architecture—Principles of Operation," SA22-7932-08, Ninth Edition, Aug. 2010, pp. 1-1496.

Final Office Action for U.S. Appl. No. 13/151,107 dated Jul. 1, 2013, pp. 1-30.

International Search Report and Written Opinion for PCT/IB2012/052296 dated Sep. 13, 2012.

International Search Report and Written Opinion for PCT/IB2012/052297 dated Sep. 13, 2012.

Office Action for U.S. Appl. No. 13/716,434 dated Apr. 30, 2013, pp. 1-24.

Office Action for U.S. Appl. No. 13/151,107 dated Feb. 21, 2013.

Examination Report for GB1319280.2 dated Nov. 22, 2013, pp. 1-3.

* cited by examiner

FACILITATING PROCESSING IN A COMMUNICATIONS ENVIRONMENT USING STOP SIGNALING

This application is a continuation of Ser. No. 13/151,119, entitled "FACILITATING PROCESSING IN A COMMUNICATIONS ENVIRONMENT USING STOP SIGNALING," filed on Jun. 1, 2011, which is hereby incorporated herein by reference in its entirety.

BACKGROUND

One or more aspects of the invention relate, in general, to processing within a communications environment, and in particular, to facilitating debug and/or recovery processing within such a communications environment.

Enterprise class computing systems, such as System z® offered by International Business Machines Corporation, require complex system functions beyond their mainline data handling of processing features. Reliability, availability, and serviceability (RAS) are a key set of requirements of an enterprise system. Enterprise systems implement advanced techniques to ensure the integrity of customer data and quick return of service when hardware failures occur. The complexity of the combined elements that make up the system requires enhanced debug features to enable the efficient isolation of design problems and their identification of root cause sources.

Enterprise class features of recovery and debug capabilities have only recently been added to certain interconnect technologies, such as PCI (Peripheral Component Interconnect) and PCIe (PCI Express). As PCI and PCIe have evolved, their recovery and debug capabilities have grown increasingly sophisticated and now include some enterprise class features relating to recovery and debugging. However, the adding of the enterprise class features has resulted in unfavorable situations at times.

BRIEF SUMMARY

Shortcomings of the prior art are overcome and additional advantages are provided through the provision of a method of facilitating processing in a communications network. The method including, for instance, receiving a signal by a network element in the communications network, the network element configured based on Peripheral Component Interconnect (PCI) technology and including a programmable logic block, the programmable logic block to receive the signal, the signal being a sideband signal that is not architected for the PCI technology; performing a logical operation on the signal to provide another signal; transmitting the another signal to one or more other network elements connected to the network element; and performing an action, based on the received signal, wherein the action is part of a coordinated action to be performed by a plurality of programmable logic blocks to provide a coordinated result.

Further, a method of facilitating processing in a communications network is provided. The method includes, for instance, automatically creating a coordinated network within the communications network, wherein the automatically creating includes: receiving a signal at a receiving network element of the communications network from a sending network element coupled to the receiving network element, based on a triggering of the signal at the sending network element; based on receiving the signal at the receiving network element: performing a logical operation on the signal to create another signal; transmitting the another signal to one or more network elements coupled to the receiving network element; performing an action based on configuration of a programmable logic block of the receiving network element; and wherein the performing the logical operation, transmitting the another signal, and performing the action are repeated one or more times by one or more other network elements creating the coordinated network, the coordinated network including network elements that perform a same action to provide a coordinated result.

Computer program products, network elements and systems relating to one or more aspects of the present invention are also described and may be claimed herein. Further, services relating to one or more aspects of the present invention are also described and may be claimed herein.

Additional features and advantages are realized through the techniques of one or more aspects of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of one or more aspects of the invention are apparent from the following detailed description taken in conjunction with the accompanying drawings in which:

DETAILED DESCRIPTION

In accordance with an aspect of the present invention, a capability is provided for facilitating processing, such as debug and/or recovery processing, within a communications environment. In particular, responsive to detecting an event, a stop signal is propagated through a communications network of the communications environment, and each network element that receives the stop signal, transmits the signal to its neighbors (if any), and then performs an action depending on its specific programming. The action can be to take no action, perform a debugging action or perform a recovery action, as examples. The elements that receive the signal and perform the same action as other elements form a coordinated network providing a coordinated result.

For instance, if a condition is detected that triggers a debug function, the network element detecting the condition transmits a stop signal to its neighbors, which then transmit it to their neighbors, and so on. Each network element that receives the stop signal, besides propagating it, takes action depending on how it is programmed. If it is programmed for debugging, then it initiates action within its trace capability, such as triggering data capture. Each network element that is programmed for debugging is part of the coordinated network for debugging, which will provide a coordinated trace.

Similarly, if an error is detected by a network element, the network element detecting the error transmits the stop signal to its neighbors, which propagate the signal to their neighbors. Further, each network element takes action depending on how it is programmed. If it is programmed for recovery, it performs, for instance, a quiesce operation. Each network element that is programmed for recovery is part of a coordinated network for recovery, which provides a coordinated quiesce of the elements within the coordinated network.

Figure 1:
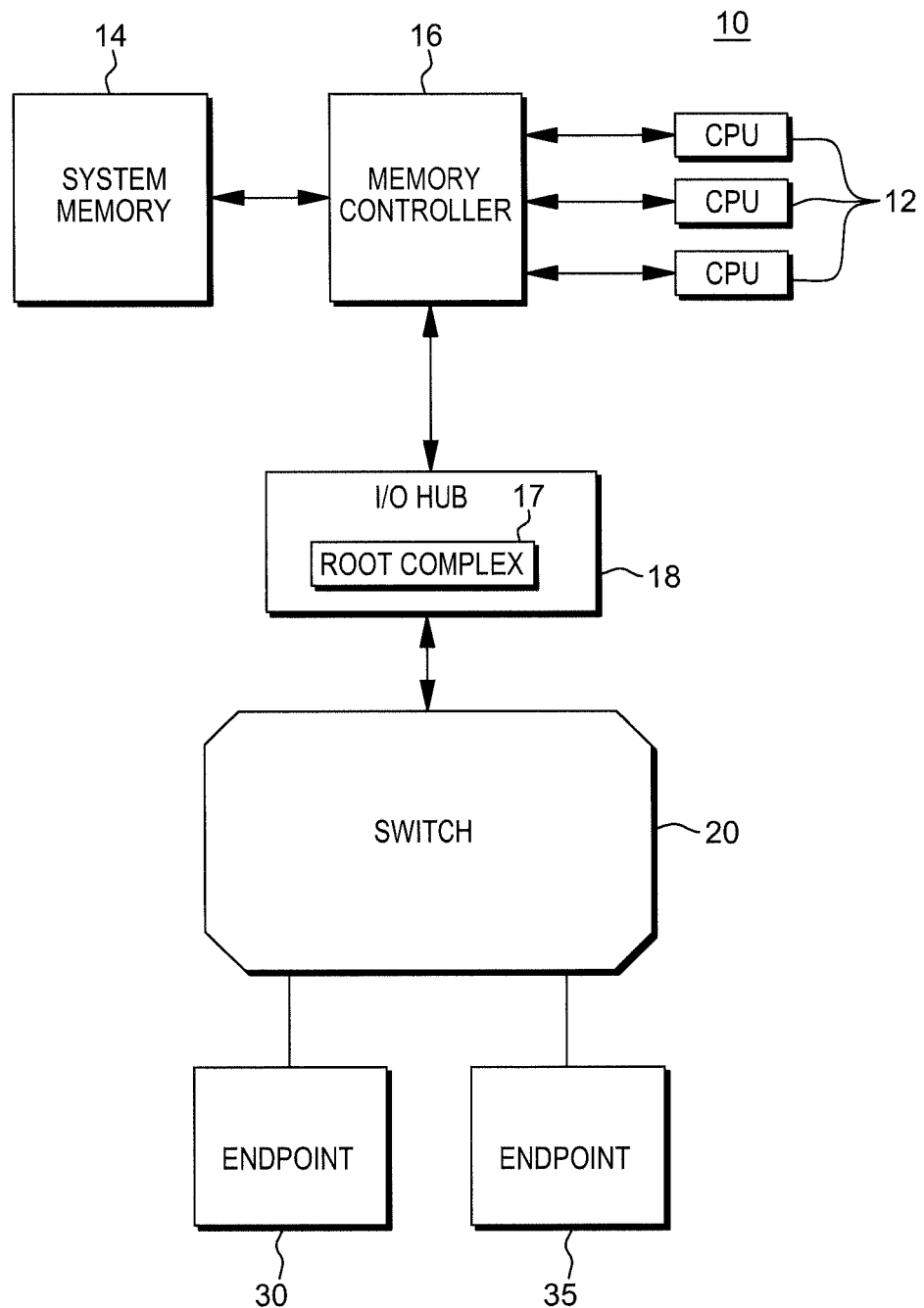
FIG. 1 depicts one embodiment of a communications environment to incorporate and use one or more aspects of the present invention.

One embodiment of a communications environment to incorporate and use one or more aspects of the present invention is described with reference to FIG. 1. In one example, a communications environment 10 includes a System z® server offered by International Business Machines Corporation. System z® is based on the z/Architecture® offered by International Business Machines Corporation. Details regarding the z/Architecture® are described in an IBM® publication entitled "z/Architecture®—Principles of Operation," IBM Publication No. SA22-7832-08, Ninth Edition, August 2010, which is hereby incorporated herein by reference in its entirety. IBM®, System z® and z/Architecture® are registered trademarks of International Business Machines Corporation, Armonk, N.Y. Other names used herein may be registered trademarks, trademarks or product names of International Business Machines Corporation or other companies.

In one example, communications environment 10 includes one or more central processing units (CPUs) 12 coupled to a system memory 14 (a.k.a., main memory) via a memory controller 16. To access system memory 14, a central processing unit 12 issues a read or write request that includes an address used to access system memory. The request, including the address (translated, if necessary), is received by memory controller 16, which accesses system memory.

In one example, memory controller 16 is comprised of hardware and is used to arbitrate for access to the system memory and to maintain the memory's consistency. This arbitration is performed for requests received from CPUs 12, as well as for requests received from one or more endpoints 30, 35. Like the central processing units, the endpoints issue requests to system memory 14 to gain access to the system memory.

In one example, endpoints 30, 35 are based on PCIe technology and may be part of one or more adapters. An endpoint issues a request that is routed to an input/output hub 18 (e.g., a PCIe hub) via one or more switches (e.g., PCIe switches) 20. In one example, the input/output hub is comprised of hardware, including one or more state machines, and is coupled to memory controller 16 via an IO-to-memory bus.

The input/output hub includes, for instance, a root complex 17 that receives a request from a switch, passes the request to the memory controller which accesses the memory. In this example, the root complex, switch and endpoints are network elements of a communications network. The communications network is based on PCIe, and thus, each element is a PCIe device.

In a further embodiment of a communications environment, in addition to or instead of one or more CPUs 12, a central processing complex is coupled to memory controller 16. The central processing complex includes, for instance, one or more partitions or zones (e.g., logical partitions), one or more central processors, and a hypervisor used to manage the logical partitions. Other variations are also possible.

Although one example of a network, including various elements, is shown and described, a network may include many additional elements, such as more than one root complex, a plurality of switches coupled to one or more root complexes, a plurality of levels of switches (e.g., switches connected to other switches etc. and then to a root complex or one or more endpoints), as well as many more endpoints, as examples. This network, which may be part of a larger network, is described herein to facilitate an understanding of situations that may arise in network processing and how these situations are addressed using one or more aspects of the present invention. Although a smaller network or a portion of a network is described herein, one or more aspects of the present invention apply equally well to larger networks.

In the network described above, recovery and debug features have been added providing scaled-up PCI; however, certain undesirable situations have risen from these added features. For instance, the added recovery features induce failure in elements that would otherwise not be affected by a failed element due to the traffic congestion caused by the recovery procedures provided by PCI. This is referred to as sympathy sickness.

Further, a general weakness of scaled up PCI for enterprise systems comes from its traditional reliance on logic analyzers in the isolation and debug of design problems. Logic analyzers are powerful debug tools allowing massive collection of data. Depending on packaging constraints, they can be hung at links throughout a system and gather a coordinated comprehensive view allowing good isolation of failures and bug sources. Enterprise class systems cannot rely on this approach, however, for much of the debug and fault isolation for numerous reasons. First, packaging constraints prevent the attaching of analyzers on many critical links. Furthermore, the sheer scale of enterprise systems makes the use of analyzers less effective since it is impractical to hang an analyzer in every link in a mainframe. Further, enterprise systems have a legacy market requirement of excellent debug and isolation in the customer data center. Consequently, there is a history of implementing large internal trace arrays across the elements. There is a requirement to coordinate the trace capture across elements. This is where a strategy based on logic analyzers falls woefully short of enterprise requirements.

Thus, in accordance with an aspect of the present invention, a capability is provided to address both the recovery shortcomings and debug weaknesses of PCIe. In one aspect, a signaling mechanism is provided that passes a stop signal to and from each element in a subsystem (e.g., communications network) which is linked together via PCIe interfaces. The stop signal allows a recovery initiative in elements configured for such initiative to prevent the consequences of a traffic back-up induced by a failure on other elements. It further allows for the coordinated capture of a comprehensive debug trace across numerous elements of the subsystem configured for such capture.

One example of a communications network based on PCIe to incorporate and use one or more aspects of the present invention is described with reference to FIG. 2. In this example, the network includes a plurality of levels starting at level 1 and continuing to level 4. Level 1 is the root complex level and includes, for instance, a root complex 100 and a root complex 101. The root complexes of level 1 are coupled to switches at level 2 via one or more links (e.g., PCIe links). For instance, root complex 100 is coupled to switch 200 and root complex 101 is coupled to switch 201. Switch 200 and switch 201 are coupled to one another. Further, the switches on level 2 are coupled to one or more other switches on level 3, again via one or more links, such as PCIe links. As shown in this example, switch 200 is coupled to switch 300 and to one or more other switches 30x. Further, switch 201 is coupled to one or more switches 31x. The switches on level 3 are further coupled to adapters on level 4 via one or more links (e.g., PCIe links). For instance, switch 300 is coupled to adapter 400 and one or more other adapters 40x. Switches 30x and 31x are also coupled to one or more adapters, not shown.

Although four levels of elements are shown in this communications network, it is understood that there may be many more levels, including additional levels of switches. Further, each level may include more or fewer elements than shown in this one example. This example is merely for illustration purposes and not meant to be limiting in any way.

Figure 2:
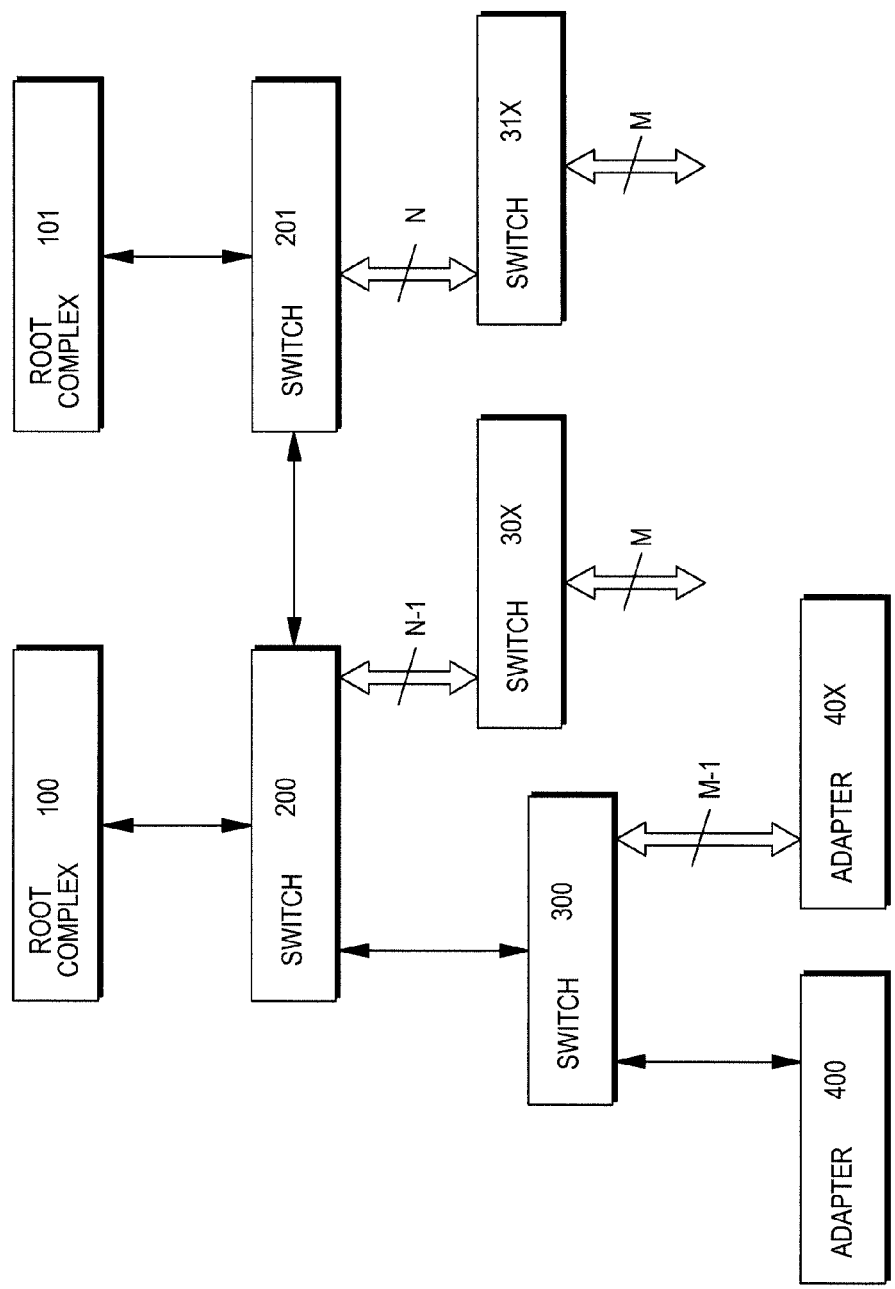
FIG. 2 depicts one embodiment of further details of a communications network of the communications environment of FIG. 1, in accordance with an aspect of the present invention.

Continuing with FIG. 2, there are two primary sub-networks shown. The first includes root complex 100, which is in a processor node hub, and is coupled to the adapters via a plurality of switches; and the second includes root complex 101, which is in another processor node hub, and is also connected to the downstream elements. These two primary sub-networks are connected such that either hub can become the processor traffic source/sink for the entire set of adapters. This can happen in two ways. First, through control switchover when a service is to be performed on the hub or its processor node. Second, it happens in uncontrolled failover when a hardware failure corrupts the processor node or the hub.

Each of the elements in the network (e.g., root complexes, switches, adapters, or a subset thereof) includes programmable trace arrays that can be set up to capture debug data, triggered by the detection of specific conditions. In some cases, the chips used to implement the elements are industry standard and have very little trace capability; while in other cases, the chips are custom designed and have substantial trace capability.

In a debug scenario, a design bug or hardware failure exists in one element or a set of elements of the network. It is often recognized by conditions within the element. When this is the case, the debug can proceed with data captured in that element's trace. However, there are certain scenarios where the condition of the bug or failure is not recognizable via trace trigger conditions within that element. In such cases, debug data simply cannot be gathered from state traces of the standard PCIe network. This makes the traces ineffective in determining the cause and solution of the problem.

In a standard PCIe recovery scenario, the PCIe link to one of the many adapters in the subsystem becomes nonresponsive. Traffic backs up as the PCIe hardware notices the condition through timeouts, and then attempts to re-train the link to make it responsive. As traffic backs up, other adapters may start to timeout operations that are pending. At times, traffic is light and the timeouts cause the proper recovery, and limit the consequences of the failing element. Other times, however, traffic is heavier and other devices are affected, but retries and fencing off failures quickly correct the symptoms and prevent more serious consequences. However, depending on how long it takes for the hardware to recognize that the link cannot be re-trained, other adapters can start experiencing more serious symptoms from the backup and require recovery actions themselves to return to a functional state. This can result in symptoms of significant consequence because recovery is designed and tested to work effectively for single points of failure. As recovery actions spread across large domains, there is an increasing probability of hitting an untested window, which can result in greater loss of resources and even outages. Often, recoveries of multiple elements are successful and return full service to all adapters. However, there are cases when outages and service calls occur due to the escalating, spreading symptoms.

Thus, in accordance with an aspect of the present invention, a signaling mechanism and associated logic are provided to address the debug weaknesses and recovery shortcomings described above. The signaling mechanism includes a stop signal and associated processing, which allows for the coordinated capture of a comprehensive debug trace across numerous elements in the network, and allows for a recovery initiative in the elements that prevents them from experiencing the consequences of a traffic back-up induced by a failure on other elements. In this example, the same signal is used to perform both functions, and the function performed in a particular element depends on its configuration, which is reprogrammable.

Figure 3A:
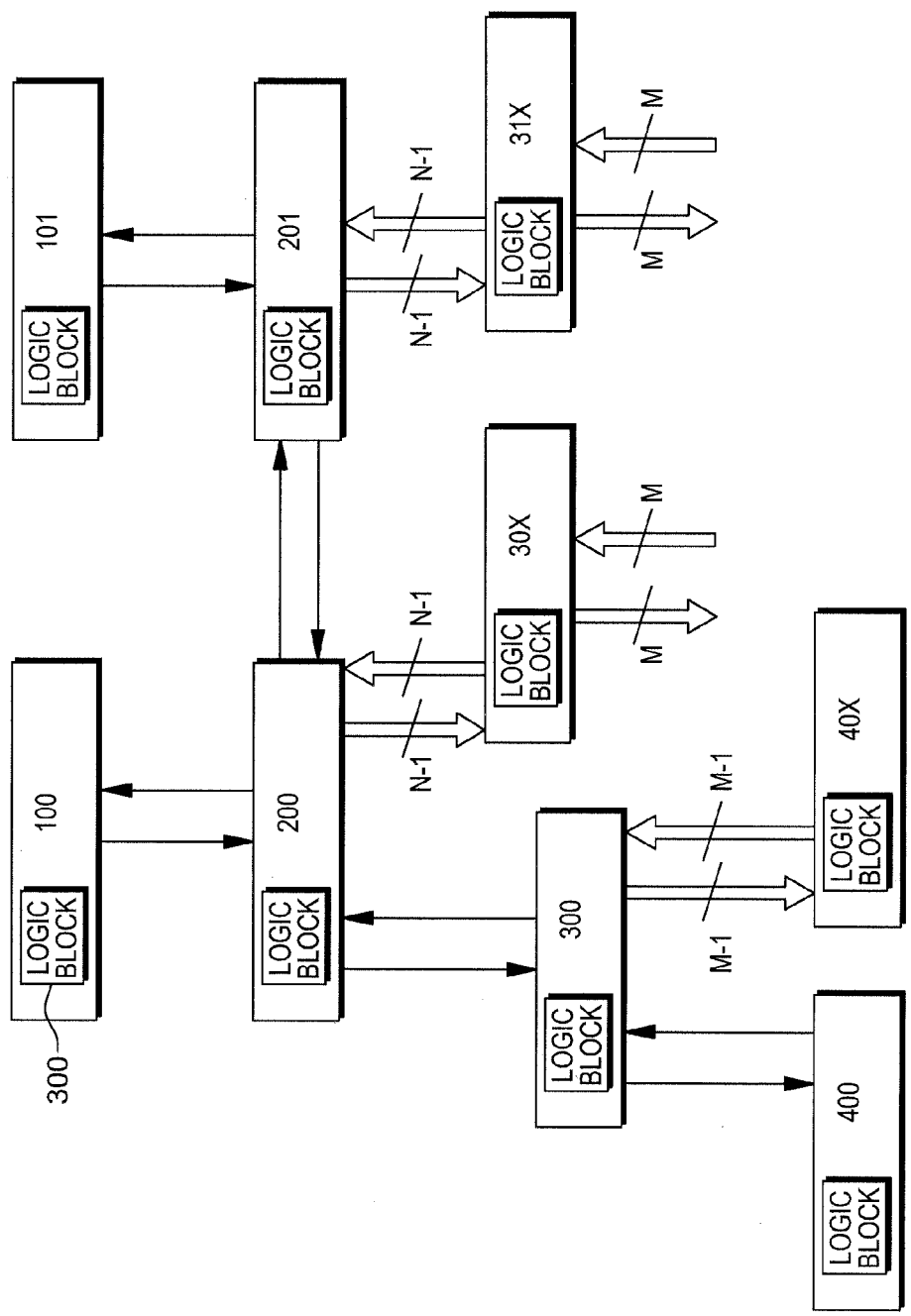
FIG. 3A depicts one embodiment of the communications network of FIG. 2 along with additional circuitry/logic to incorporate and/or use one or more aspects of the present invention.

Referring to FIG. 3A, in this example, each element of the network has a corresponding programmable logic block 300. The logic block is programmed specifically for the element in which it is included. It may be programmed to perform a debug action, a recovery action or neither. In one example, it is implemented using a programmable hardware device, such as a field programmable gate array, and therefore, its programming may be changed, if desired. (In a further embodiment, one or more elements may be selected not to have the programmable logic block or to participate in one or more of the provided capabilities.)

Figure 3B:
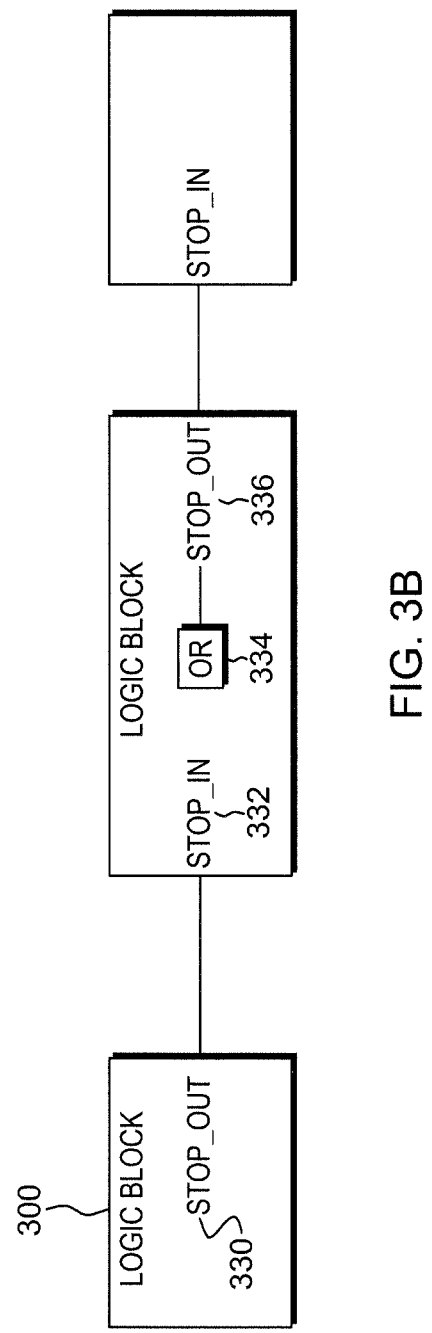
FIG. 3B depicts further details of a logic block shown in FIG. 3A, in accordance with an aspect of the present invention.

As shown in FIG. 3B, the signals traversing these blocks are STOP_IN/STOP_OUT signals. When an element in the network hits the conditions that are programmed to trigger a stop, it transmits a STOP_OUT signal 330 from its logic block 300. Each logic block receives the stop signal from their neighboring logic block, as a STOP_IN signal 332. In accordance with an aspect of the present invention, the receiving logic block logically ORs 334 its own signal with the STOP_IN signal to provide a combined signal that is transmitted out as a STOP_OUT signal 336. Each logic block is programmable in terms of determining how and whether it locally reacts to the incoming stop signal. The stop signaling and associated logic on each element combines to create a stop network. The stop network allows for powerful programmable configuration of debug trigger and capture capability, as well as for powerful recovery functions. Each of these is described in further detail below.

In an ideal chip using one or more aspects of the present invention, there is complex logic that can be applied to the generation of the stop, and there is a large and rich trace capability which can capture numerous critical signals that are useful to debug a problem. But in some industry standard chips, this is not possible and there are only limited trace and minimal programmable logic capability that allows for participation in the stop network. Nevertheless, the stop network combines and coordinates the capabilities of various elements across the network, bringing advantages of the entire debug capabilities of the network to each local element.

When an error condition is recognized anywhere in the network, data is captured everywhere in the network (i.e., everywhere that is programmed for the debug function). This renders a coordinated picture of the failure across a broad set of perspectives, enabling superior problem insights and isolation capabilities.

Consider the debug of a failure which occurs only when specific types of packets are passing through an element. It may be that one element which does not play a direct role in the bug has the capability to monitor and trigger off of a very specific set of characteristics of a PCIe header. That element can signal the capture of data that is corrupted by the bug in elements before and after the corrupting element. The total network then provides a snapshot of the data before and after corruption. This capability thereby greatly increases the debug effectiveness of the elements in the network.

In one example, each element participating in the debug capture collects debug data in a trace array located within the element, responsive to receiving the stop signal. This data is then collected from each element. For example, the data is read from the trace arrays through the PCI network by addressing the arrays and reading out a word at a time.

As previously stated, the stop network has a recovery function, as well as the debug function. When an element in the stop network has detected a condition which renders it non-communicative, it transmits the stop signal to its neighbors, which propagate the signal to their neighbors, and so forth. The stop signal in this scenario can be programmed to quiesce traffic at the element (e.g., initiation of traffic). Thus, the stop network can be configured to transmit a quiesce signal (i.e., the stop signal) to the entire network.

In one example, adapters that are configured to interpret the signal can use the signal to initiate a quiesce of traffic (e.g., direct memory access (DMA) traffic or any traffic initiated from the adapters, except for recovery). This quiesce of traffic initiated by the adapters radically cuts down on the traffic entering the traffic jam within the network that was caused by the original failure. Therefore, the size and severity of the back-ups are substantially improved. It should be noted that such a stop could be signaled by the element that had the failure, or by an element detecting the break in communications, or by the host (e.g., firmware on the host) that has been informed of the breakdown of communications. The more adapters that participate in this quiesce of traffic, the more contained the consequences of the traffic jam become. The mechanism is still effective if only a subset of the adapters is participating. (Firmware, as used herein, includes, e.g., the microcode, millicode and/or macrocode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.)

A particularly valuable aspect of limiting the size of a traffic jam stems from the ability of the host (e.g., firmware) to take action when a failure occurs and isolate the failure from the system. The host can do this by dropping a link or by raising a fence. Either of these actions causes packets to be discarded before they reach the non-communicative element. The traffic jam dissipates and the other elements in the network do not suffer any consequences of the failure.

Figure 4A:
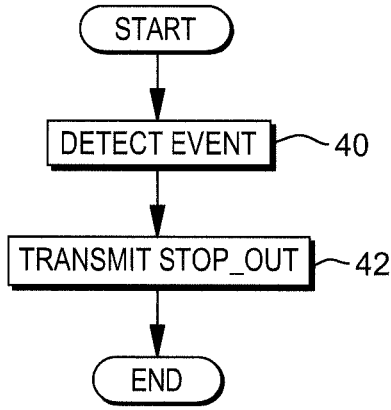
FIG. 4A depicts one embodiment of the logic associated with transmitting a stop signal, in accordance with an aspect of the present invention.

One embodiment of the logic associated with the stop signal and its corresponding processing is described with reference to FIGS. 4A-4B. Referring to FIG. 4A, initially, an element of the network detects an event (e.g., an error, a debug condition, etc.), STEP 40. Responsive thereto, the element transmits a STOP_OUT signal to one or more of its neighboring elements, STEP 42. In one particular example, it transmits the signal to each neighboring element that it is connected to via a link (e.g., PCIe link).

Figure 4B:
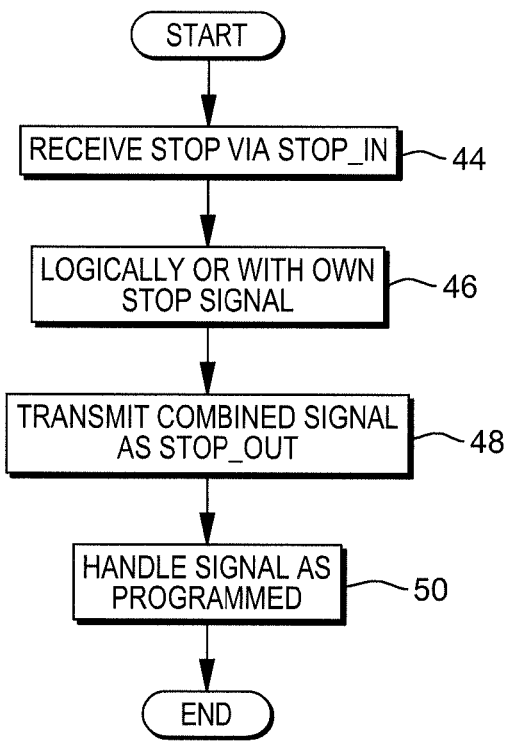
FIG. 4B depicts one embodiment of the logic associated with receiving the stop signal and taking action responsive thereto, in accordance with an aspect of the present invention.

Referring to FIG. 4B, an element connected to the transmitting element receives the stop signal via STOP_IN, STEP 44. Responsive thereto, the receiving element logically ORs the STOP_IN signal with its own signal creating a combined signal, STEP 46. The combined signal is then sent from the receiving element to its neighboring elements as a STOP_OUT signal, STEP 48. Further, the receiving element performs an action based on its programming, STEP 50. As examples, it takes no action; it performs a debug function and captures trace data; or it performs a recovery action, such as not sending out DMA requests towards the root complex to minimize the traffic in the network. By not sending out the DMA requests, the amount of DMA requests and corresponding replies in the fabric are reduced, which decreases the likelihood of sympathy sickness due to traffic jams.

By using the stop signal and associated logic, coordinated networks are created for the communications network. These coordinated networks are logical networks that are dynamically and automatically created based on a particular function to be performed, responsive to receiving the stop signal. Each coordinated network includes one or more elements, each of which is performing the same function as the other elements within the coordinated network. For instance, a debug coordinated network includes all the elements to perform the debug function, and a recovery coordinated network includes all the elements to perform a recovery function. Since the elements in a coordinated network are all performing the same action, a coordinated result is provided (e.g., comprehensive trace data for all the elements in the debug coordinated network regardless of individual debug capability; comprehensive quiescing for the recovery coordinated network).

Described in detail above is a capability for facilitating debug and recovery processing in systems that use PCI-based technology, such as PCIe. One or more aspects of the present invention facilitate debug processing by greatly improving the total debug trace capability of a PCIe based hardware I/O subsystem; increasing the capture rate of the trace triggering mechanisms; and increasing the volume and quality of the debug data content of the trace arrays across the subsystem when a failure or other condition is captured.

For the debug capability, as long as the condition is recognizable by one of the elements, the stop signal can be raised, regardless of whether it was the element that failed or caused the condition or another element. The signal is propagated to, for instance, all the elements in the network. Each element that is programmed to capture trace on the stop signal will trigger to form a large coherent trace of the entire network. This brings the strengths of the best traces all together, and renders them useful to all the elements. A corrupted packet can be viewed as it traverses the network, before and after the event. This can be set up for field problems allowing call home with great quantities of debug data without disrupting customers.

Further, one or more aspects of the present invention facilitate recovery processing by decreasing the likelihood of sympathy sickness by asserting a stop signal when a failure occurs, and quiescing traffic generation in, for instance, the adapters (e.g., channels in a system that uses a channel subsystem) when the stop is recognized; speeds up resolution of backpressure traffic congestion; decreases the scope of congestion and recovery; increases the likelihood of minimal symptoms; and decreases the likelihood of check-stops or outages because of back-ups.

For recovery, the stop signal can be sent by the element (e.g., hardware) causing an error or a back-up; the element detecting the back-up; and/or firmware detecting the back-up.

As an example, adapters (e.g., channels) enabled for stop recovery can quiesce DMA traffic (and/or other traffic) generation to minimize the traffic jam. Smaller jams clear out faster and cause less time-outs. It decreases the number of adapters going into recovery and increases the likelihood of a perfect recovery.

By using the above capabilities, reliability of PCI is enhanced via use of a sideband signaling capability. The signaling capability is sideband since it is not an architected or design feature of PCI. It is not specified in the PCI specifications, which are maintained by the PCI SIG (PCI Special Interest Group). Instead, it is added in accordance with one or more aspects of the present invention.

As will be appreciated by one skilled in the art, one or more aspects of the present invention may be embodied as a system, method or computer program product. Accordingly, one or more aspects of the present invention may take the form of an entirely hardware embodiment, an entirely software embodiment (including firmware, resident software, micro-code, etc.) or an embodiment combining software and hardware one or more aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electromagnetic, optical or any suitable combination thereof. A computer readable signal medium may be any computer readable medium that is not a computer readable storage medium and that can communicate, propagate, or transport a program for use by or in connection with an instruction execution system, apparatus or device.

A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 5:
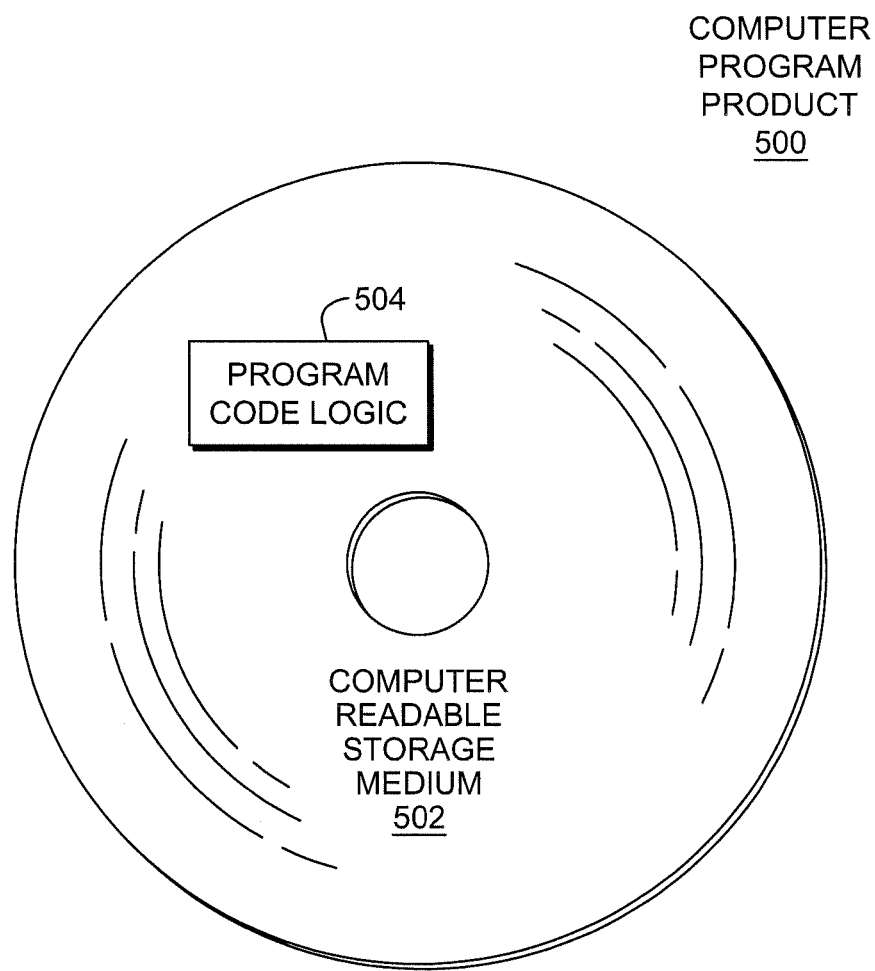
FIG. 5 depicts one embodiment of a computer program product incorporating one or more aspects of the present invention.

Referring now to FIG. 5, in one example, a computer program product 500 includes, for instance, one or more non-transitory computer readable storage media 502 to store computer readable program code means or logic 504 thereon to provide and facilitate one or more aspects of the present invention.

Program code embodied on a computer readable medium may be transmitted using an appropriate medium, including but not limited to wireless, wireline, optical fiber cable, RF, etc., or any suitable combination of the foregoing.

Computer program code for carrying out operations for one or more aspects of the present invention may be written in any combination of one or more programming languages, including an object oriented programming language, such as Java, Smalltalk, C++ or the like, and conventional procedural programming languages, such as the "C" programming language, assembler or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

One or more aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of one or more aspects of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the present invention may be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider may receive payment from the customer under a subscription and/or fee agreement, as examples. Additionally or alternatively, the service provider may receive payment from the sale of advertising content to one or more third parties.

In one aspect of the present invention, an application may be deployed for performing one or more aspects of the present invention. As one example, the deploying of an application comprises providing computer infrastructure operable to perform one or more aspects of the present invention.

As a further aspect of the present invention, a computing infrastructure may be deployed comprising integrating computer readable code into a computing system, in which the code in combination with the computing system is capable of performing one or more aspects of the present invention.

As yet a further aspect of the present invention, a process for integrating computing infrastructure comprising integrating computer readable code into a computer system may be provided. The computer system comprises a computer readable medium, in which the computer medium comprises one or more aspects of the present invention. The code in combination with the computer system is capable of performing one or more aspects of the present invention.

Although various embodiments are described above, these are only examples. For example, computing environments of other architectures can incorporate and use one or more aspects of the present invention. Further, other interconnect technologies can benefit from one or more aspects of the present invention. Moreover, the stop signal and associated processing can be used for other than debug and recovery.

Further, other types of computing environments can benefit from one or more aspects of the present invention. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

As a further example, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiment with various modifications as are suited to the particular use contemplated.

What is claimed is:

1. A method of facilitating processing in a communications network, said method comprising:

receiving a signal by a network element in the communications network, the network element configured based on Peripheral Component Interconnect (PCI) technology and including a programmable logic block, the programmable logic block to receive the signal, the signal being a sideband signal that is not architected for the PCI technology, and the programmable logic block to handle the signal based on configuration of the programmable logic block;

performing a logical operation on the signal to provide another signal;

transmitting the another signal to one or more other network elements connected to the network element; and performing, by the programmable logic block of the network element, based on the received signal, an action, the action being a particular action based on the configuration of the programmable logic block, and wherein the action is part of a coordinated action to be performed by a plurality of programmable logic blocks of a plurality of network elements to provide a coordinated result, the coordinated result being a result based on the particular action to be performed by the plurality of programmable logic blocks, the plurality of programmable logic blocks including the programmable logic block and other programmable logic blocks to perform the particular action and to receive a particular signal, the particular signal comprising the signal, the another signal or a further signal associated with the signal, and the plurality of programmable logic blocks forming a logical network automatically created based on being configured to perform the particular action and receipt of the particular signal.

2. The method of claim 1, wherein the action comprises stopping a sending of direct memory access requests, and wherein the coordinated action comprises stopping the sending of direct memory requests by the plurality of programmable logic blocks.

3. The method of claim 1, wherein the action comprises capturing a trace comprising debug data, and wherein the coordinated action comprises capturing trace debug data by the plurality of programmable logic blocks.

4. The method of claim 1, wherein the logical operation comprises a logical OR operation performed between the signal and a selected signal of the network element to provide the another signal.

5. The method of claim 1, wherein the transmitting comprises transmitting the another signal to each neighboring network element connected to the network element.

6. The method of claim 1, wherein the signal is received from another network component, based on detection of an event by the another network component.

7. The method of claim 1, wherein the communications network comprises a root complex coupled to one or more switches via one or more PCI based links, the one or more switches coupled to one or more endpoints via one or more PCI based links, the one or more endpoints being part of one or more adapters, and wherein the network element comprises one of the root complex, a switch or an endpoint.

8. The method of claim 1, wherein the signal comprises a stop signal, the stop signal indicating the another signal is to be transmitted and the action is to be performed, the action being based on programming of the programmable logic block.

9. The method of claim 1, wherein the one or more other network elements are configured based on PCI technology.

10. A method of facilitating processing in a communications network, said method comprising:
   automatically creating a coordinated network within the communications network, wherein the automatically creating comprises:
      receiving a signal at a receiving network element of the communications network from a sending network element coupled to the receiving network element, based on a triggering of the signal at the sending network element;
      based on receiving the signal at the receiving network element:
         performing a logical operation on the signal to create another signal;
         transmitting the another signal to one or more network elements coupled to the receiving network element;
         performing an action based on configuration of a programmable logic block of the receiving network element; and
      wherein the performing the logical operation, transmitting the another signal, and performing the action are repeated one or more times by one or more other network elements creating the coordinated network, the coordinated network including network elements that perform a same action, based on receiving the signal, the another signal or a further signal based on the signal, to provide a coordinated result.

11. The method of claim 10, wherein the action comprises obtaining debug information.

12. The method of claim 11, wherein the coordinated result comprises obtaining debug information for the coordinated network, wherein the network elements of the coordinated network have varying debug capabilities.

13. The method of claim 10, wherein the action comprises performing a recovery operation.

14. The method of claim 13, wherein the coordinated result comprises a quiesce of one or more network elements of the communications network.

15. The method of claim 10, wherein at least one other network element in the communications network is programmed to perform another action different from the action.

16. The method of claim 10, wherein the logical operation comprises a logical OR operation performed between the signal and a selected signal of the network element to provide the another signal.

17. The method of claim 10, wherein the communications network comprises a root complex coupled to one or more switches via one or more PCI based links, the one or more switches coupled to one or more endpoints via one or more PCI based links, the one or more endpoints being part of one or more adapters, and wherein the network element comprises one of the root complex, a switch or an endpoint.

18. The method of claim 10, wherein the signal comprises a stop signal, the stop signal indicating the another signal is to be transmitted and the action is to be performed, the action being based on programming of the programmable logic block.

19. The method of claim 10, wherein the one or more other network elements are configured based on PCI technology.

20. A method of facilitating processing in a communications network, said method comprising:
   receiving a signal by a network element in the communications network, the network element configured based on Peripheral Component Interconnect (PCI) technology and including a programmable logic block, the programmable logic block to receive the signal, the signal being a sideband signal that is not architected for the PCI technology, and the network element to handle the signal based on configuration of the programmable logic block;
   performing a logical operation on the signal to provide another signal;
   transmitting the another signal to one or more other network elements connected to the network element; and
   performing, by the network element, based on the received signal, an action, the action being a particular action based on the configuration of the programmable logic block, and wherein the action is part of a coordinated action to be performed by a plurality of network elements to provide a coordinated result, the coordinated result being a result based on the particular action to be performed by the plurality of network elements, the plurality of network elements including the network element and other network elements to perform the particular action and to receive a particular signal, the particular signal comprising the signal, the another signal or a further signal associated with the signal, and the plurality of network elements forming a logical network automatically created based on being configured to perform the particular action and receipt of the particular signal.

* * * * *